M. KARG.
Car-Brakes.

No. 144,681.

Patented Nov. 18, 1873.

Attest:
Alex. Selkirk
W. F. Selkirk

Inventor:
Martin Karg

UNITED STATES PATENT OFFICE.

MARTIN KARG, OF ALBANY, NEW YORK, ASSIGNOR TO HIMSELF AND MICHAEL HABER, OF SAME PLACE.

IMPROVEMENT IN CAR-BRAKES.

Specification forming part of Letters Patent No. 144,681, dated November 18, 1873; application filed January 10, 1871.

*To all whom it may concern:*

Be it known that I, MARTIN KARG, of the city of Albany, State of New York, have invented certain new and useful Improvements in Brakes for Railroad-Cars; and I do hereby declare that the following is a description thereof, reference being had to the accompanying drawings forming a part of this specification, in which—

Figure 1:
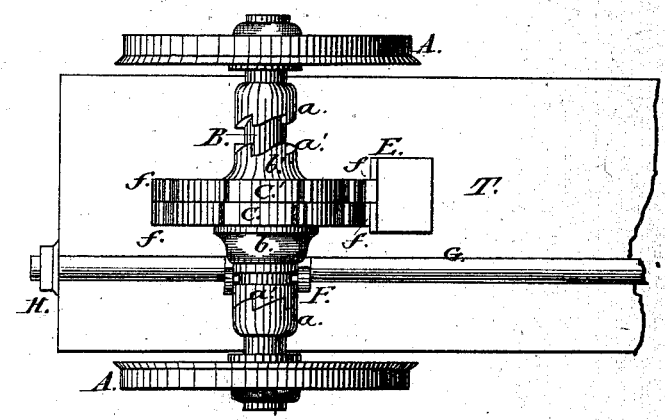
Figure 2:
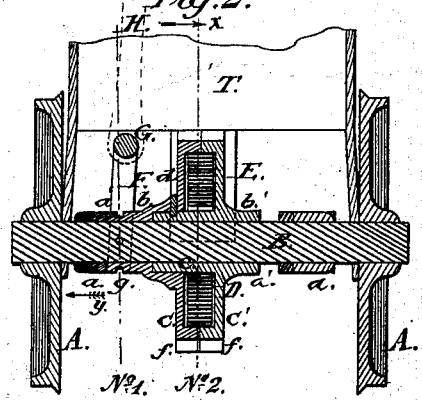
Figure 3:
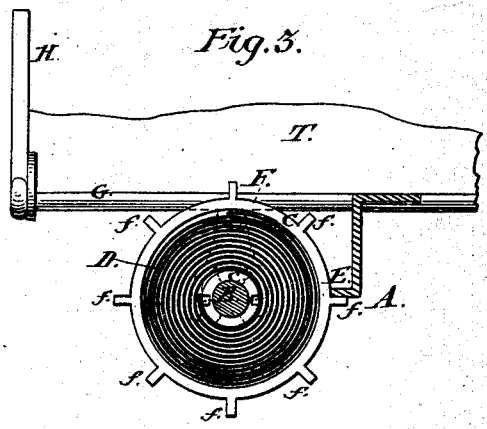

Figure 1 represents a vertical view from beneath of an axle of a truck or car with the invention applied. Fig. 2 is a lateral vertical section of the invention applied to a car. Fig. 3 is a side elevation of the invention at lines Nos. 1 and 2 in Fig. 2.

My invention relates to certain devices so arranged as to be capable of gradually braking the wheels of a car, and effecting a stoppage of the revolutions of the same.

To enable others skilled in the art to make and use my invention, I will proceed to describe it in reference to the drawings and the letters of reference marked thereon, the same letters indicating like parts.

In the drawings, A A represent the wheels. B is the axle, which is supported by the bearings, attached to the truck in any of the usual known modes. To the axle B are firmly attached the clutches $a\ a$. At near the center of the axle B are two loose wheels, C and C'. The said wheels C and C' are made with chambers to receive the coiled spring D, Figs. 2 and 3. The hub $b$ of the wheel C is recessed to receive a portion, $c$, of the hub $b'$ of the second wheel C', as shown in Fig. 2. The portion $c$ of the hub $b'$ is furnished with the groove $e$, which receives the ends of the key $d$, which passes down through the hub $b$ of the wheel C, to which the said key $d$ is secured. The wheels C and C' are each furnished with several short arms, $f\ f\ f$, some one of which is intended to engage (when this invention is operated) with the stop E, secured to some portion of the truck or car. The inner end of the coiled spring D is attached to a portion, $c'$, of the hub of the wheel C', while the outer end of the said coil is secured to the inside of the outer rim of the wheel C. The ends of the hubs $b$ and $b'$ of the wheels C C' are furnished with clutches $a'\ a'$, to correspond with the clutches $a\ a$ fixed on the axle B. By the means of the said clutches $a\ a$ and $a'\ a'$, either one of the wheels C or C' can be made to revolve with the axle B, so as to engage with one of the clutches $a$. A reverse longitudinal movement of the said wheels will cause the opposite wheel to engage with the opposite clutch. The hub $b$ of the wheel C is provided with a groove, $g$, to receive the forked lever F attached to the shaft G. A lever, H, attached to the end of the shaft G, at the rear of the car or truck, is also provided to operate the shaft G, and its attached lever F, to throw the wheels in either direction. The stop E, attached firmly to some part of the car or truck, is placed opposite the center of the wheels C C', as shown in Figs. 1 and 3, to engage with some one of the arms $f$ of one of the wheels C or C', which may be moved on the axle B, opposite the said stop.

In my invention, the clutch $a$ holds the wheel C, and causes the same to revolve, while one of the arms $f$ of the wheel C', engaging with the stop E, holds the said wheel C' from revolving with the wheel C, and causes the coiled spring D to wind up; and, as the said spring D is being tightened in its coil, the action of the tightening coil will be such as to gradually slacken the speed of the revolution of the wheels A A and their axle B until they are brought to a stand-still by the limit of the coiled spring. And as long as the lever H is kept in the position before shown, the wheels A A will be held rigid; and a release of the said lever H from such a position to a perpendicular will disengage the clutches $a$ and $a'$ from each other, and also the arm $f$ of the wheel C' from the stop E, and prevent it from uncoiling and the wheels C C' from revolving with the axle B.

When the cars are rolling in an opposite direction, the lever H must be moved from a perpendicular to a reverse position from that shown in Fig. 2, when the opposite clutch $a'$ will engage with its clutch $a$, so as to cause the wheel C' to revolve with the axle D, and at the same time bring one of the arms $f$ of the wheels C to engage with the stop E, when similar results will be secured by the tightening of the spring D.

These improvements are simple in all their parts, and the action of this invention for braking the wheels is gradual, as is desired; and it is readily seen that, in all cases, the distance which the wheels A A will run after the brake is applied before being brought to a stop can be known by the limit given to the coil, so that the engineer, conductor, or brakesman, can know just when to apply the brake.

Having described my invention, what I claim, and desire to secure by Letters Patent, is—

1. The combination of the stop E, attached to the truck or car, with the arms $ff$, attached to the wheels C C', connecting the coiled spring D, substantially as and for the purpose set forth.

2. The combination of the stop E, secured to the truck or car, with the arms $ff$, attached to the wheels C C', containing the coiled spring D, axle B, and clutches $b\ b'$ and $a\ a'$, when all are arranged substantially as and for the purpose set forth.

MARTIN KARG.

Witnesses:
   ALEX. SELKIRK,
   W. F. SELKIRK.